United States Patent [19]
Arkharov et al.

[11] 3,907,447
[45] Sept. 23, 1975

[54] DEVICE FOR LOCKING AN ACTUATING ELEMENT

[76] Inventors: Alexei Mikhailovich Arkharov, Yartsevskaya ulitsa 28, korpus 1, kv. 51; Nikolai Trofimovich Romanenko, Tokmakov pereulok, 13-15, kv. 165; Jury Filippovich Nikitin, ulitsa Arbat, 18, kv. 31; Ljudmila Anatolievna Litenkova, Bashilouskay ulitsa, 19, kv. 158, all of Moscow, U.S.S.R.

[22] Filed: Nov. 16, 1973

[21] Appl. No.: 416,631

[52] U.S. Cl. ............... 403/316; 403/393; 403/392
[51] Int. Cl.² ........................................ G05G 5/00
[58] Field of Search .......... 403/315, 393, 316, 311, 403/28, 392, 12, 293; 85/33; 160/1, 2, 9; 49/1

[56] References Cited
UNITED STATES PATENTS

| | | | |
|---|---|---|---|
| 2,289,710 | 7/1942 | Kelso | 403/392 |
| 2,399,133 | 4/1946 | Midling | 403/316 |
| 2,751,238 | 6/1956 | Vegren | 403/316 |
| 3,378,031 | 4/1968 | Hatashita | 251/129 X |
| 3,428,346 | 2/1969 | Fredd | 403/311 |
| 3,797,336 | 3/1974 | Howe | 85/33 X |
| 3,811,717 | 5/1974 | Floyd et al | 49/1 |

*Primary Examiner*—Richard J. Scanlan, Jr.
*Assistant Examiner*—Wayne L. Shedd
*Attorney, Agent, or Firm*—Waters, Schwartz & Nissen

[57] ABSTRACT

A device for locking an actuating element comprising a lock which consists of a support and a catch, their mating surfaces having a recess and a projection which engage for locking the actuating element. The external surface of the lock has a portion in the form of a solid of revolution which carries a retainer for fixing the relative positions of the support, catch and actuating element, said retainer being constituted by a torsional spring whose inside diameter in a free state is larger than the diameter of the cylindrical portion by the size of the projection. Being relatively simple in design, this device allows an actuating element subjected to a load of several tons to be held locked by a force of several hundred grams.

8 Claims, 9 Drawing Figures

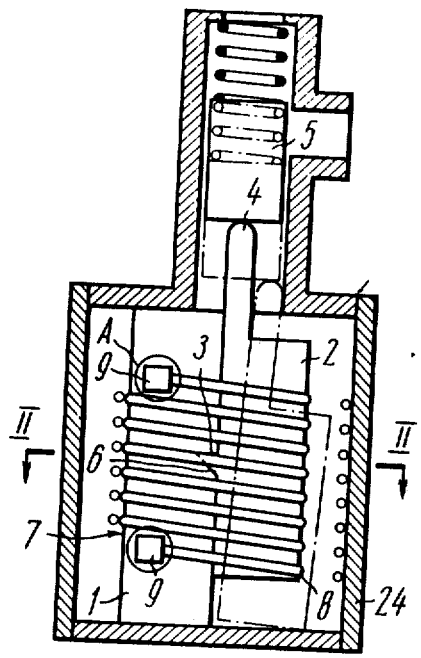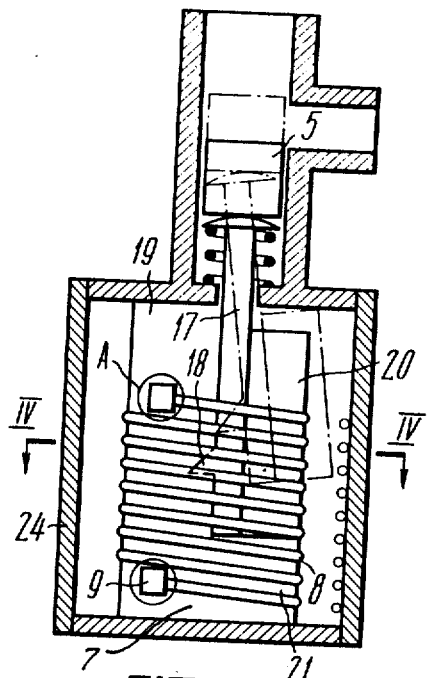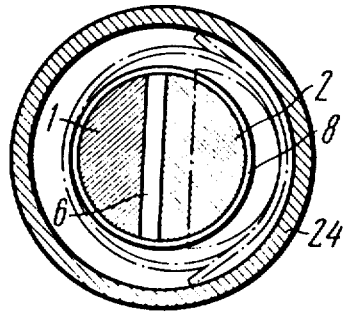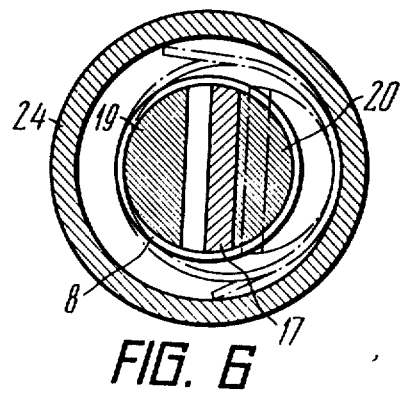
FIG. 1
FIG. 5
FIG. 2
FIG. 6

DEVICE FOR LOCKING AN ACTUATING ELEMENT

The present invention relates to locking devices and more specifically it relates to devices for locking an actuating element in a preset position.

The device realized according to the present invention can be used most successfully for remote disengagement of the elements of a mechanism, e.g. safety valves, flange joints, tie-pieces, etc.

Widely known in the art are devices for locking an actuating element such as a valve of a hydraulic system.

These prior-art devices comprise a support and a matching catch which, taken together, form a lock. The catch is made in the form of balls located in the through holes of the support. When the loaded actuating element, i.e. the valve, is locked in the preset position, the balls are held in contact with it by means of a retainer which fixes the balls, the support and the actuating element relative to one another. The retainer is installed with a provision for progressive motion in order to release the actuating element for which purpose the retainer is kinematically linked with a drive.

In these devices the loaded actuating element is released by applying a considerable force to the retainer in order to impart progressive motion to the latter. The forces applied to the retainer reach tens and hundreds of kilograms when the load on the actuating element amounts to a few tons; this, in turn, calls for increasing the power of the drive which imparts progressive motion to the retainer.

An object of the present invention is to reduce the force to be applied to the retainer for holding the actuating element in the preset position.

Another object of the present invention lies in providing a device relatively small in size and of a light weight.

In accordance with these and other objects we hereby claim a device for locking the actuating element.

This object is accomplished by providing a device for locking comprising a lock which consists of a support and a catch adapted for holding the loaded actuating element in a preset position with the aid of a retainer which fixes the support and the catch relative to each other, said retainer being capable of moving to release the actuating element wherein, according to the invention, the support and the catch contact each other by the surfaces one of which has a recess and the other one, a projection, said support and catch mating in the course of locking the actuating element whereas the external surface of the lock has a portion in the form of a solid of revolution which carries the support-and-catch retainer constituted by a torsional spring at least one end of which is connected to a means which keeps said spring against untwisting in the course of locking the actuating element and releases it when said element is unlocked, the inside diameter of said spring in a free state being larger than the outside diameter of said portion by at least the size of the projection.

It is practicable that said portion of the lock should be made in the shape of a cylinder.

This shape of the lock portion is simplest and most practicable in manufacture.

It is no less practicable that said portion of the lock should have a concave external surface.

Such a configuration of the lock portion provides for reliable mounting of the spring since the latter tends to creep towards its middle and not to the ends.

It is also practicable that the portion carrying the retainer should be constituted by the external surfaces of the catch and support shaped like segments in cross-section.

Such a design proves to be the simplest one.

It is expedient that the portion carrying the retainer should be constituted by a support made of two parts, each of them having a segmental shape in cross section, and the catch should be located between these parts.

This design of the support allows the use of a flat catch thus simplifying its manufacture.

It is no less expedient that said portion of the lock should be constituted by a support consisting of three parts shaped, each, as a sector in cross section and that the catch should be made in the form of a bar located between these sectors.

This arrangement increases the area of contact between the projection and the recess and consequently increases the load imposed by the actuating element at the same size of the device.

It would be a simple engineering solution if the means for holding the spring while locking the actuating element and releasing it while unlocking said element should be made of two bars whose ends should be connected at one side by an easily-melting material adjoining an electrical heating element while their other ends should be connected, respectively, with the end of the spring, and the support.

Good results can be obtained if the portion carrying the retainer should be made, at least on one of its ends, in the form of a solid cylinder for mounting several turns of the spring and one of its ends.

Mounting several turns of the spring on the solid (non-diverging) portion of the lock reduces considerably the force required to hold the spring against untwisting.

The device for locking the actuating element in a preset position according to the present invention is simple and easy to manufacture, has a small size and light weight and, additionally, allows the actuating element subjected to a load of several tons to be held in a preset position by applying a force of a few hundred grams to the lock.

Other objects and advantages of the device for locking the actuating element in a preset position, realized according to the present invention, will be made more apparent by the description that follows with reference to the accompanying drawings, in which:

FIG. 1 shows a device for locking the actuating element according to the invention, longitudinal section, first embodiment;

FIG. 2 is a section taken along line II—II in FIG. 1;

FIG. 5 shows another embodiment of the device for locking the actuating element according to the invention, longitudinal section;

FIG. 6 is a section taken along line VI—VI in FIG. 5;

Figure 3:
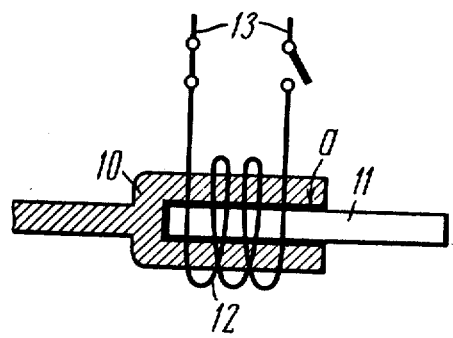
FIG. 3 shows a fragment A in FIG. 1, enlarged, one version of the means for holding the spring.

The device for locking the actuating element comprises a support 1 (FIGS. 1, 2) and a mating catch 2. Taken together, said support and catch form a lock. The support 1 is a half-cylinder whose flat surface is provided with a recess 3.

The catch 2 is made in the form of a half-cylinder and its end 4 is adapted for acting on the actuating element 5.

The side of the catch 2 adjoining the flat surface of the support 1 is provided with a projection 6 which snaps into the recess 3 of the support 1 for locking the actuating element.

The projection 6 and the recess 3 become engaged in the course of locking the actuating element 5. In the engaged position, i.e. when the projection 6 of the catch 2 enters the recess 3 of the support 1, the support 1 and the catch 2 form a cylindrical portion 7. This portion carries a cylindrical spring 8 which serves as a retainer for fixing the relative positions of the catch 2 and support 1. One end of the spring 8 is secured to the support 1 while its other end is connected to a means 9 which keeps said spring from untwisting when the actuating element is locked and allows it to untwist when the actuating element 5 is unlocked. The inside diameter of the spring 8 in a free state is larger than the outside diameter of the cylindrical portion 7 at least by the size of the projection 6.

The means 9 consists of two bars 10 (FIG. 3) and 11 whose ends are connected at one side by a low-melting material $a$.

The ends of the bars 10, 11 interconnected by the low-melting material $a$ are wound with a wire 12 whose ends are connected to a source of current 13. This wire serves as a heating element.

The other ends of the bars 10 and 11 can be rigidly secured, respectively, to the end of the spring 8 and to the support 1.

Such a means ensures remote control for releasing the ends of the torsional spring 8 and, as a consequence, remote unlocking of the actuating element 5.

Figure 4:
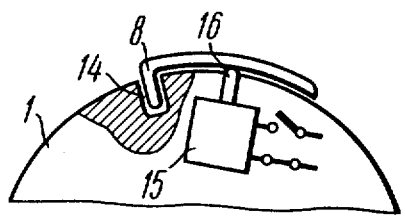
FIG. 4 shows fragment A in FIG. 1, enlarged, another version of the means for holding the spring.

If the device is intended for operation, its means 9 for holding and releasing the spring 8 has a slot 14 made in the support 1 (FIG. 4) for inserting the end of the spring 8 to keep the latter against untwisting, and an electric drive 15 which releases the end of the spring 8.

This drive incorporates a rod 16 which acts on the spring 8, thus withdrawing it from the slot 14.

The spring can also be kept from untwisting and released by any other device suitable for this purpose.

To simplify the manufacture of the catch 17 (FIGS. 5, 6) which is the most heavily loaded part of the device, it is made flat and has a projection 18 on one side of its surfaces.

The support consists of two parts 19 and 20 having, each, a segmental shape in cross section; the flat surfaces of these segments adjoin the catch 17 while their cylindrical surfaces form the lock portion 7. The part 19 of the support has a solid cylinder 21 at the end, said cylinder carrying several turns of the spring 8 and the end of said spring connected with the means 9. Such a design of the support makes it possible to reduce considerably the force required for keeping the spring against untwisting.

If the catch 22 (FIGS. 7, 8) is made in the form of a bar, the support consists of three parts 23 each of which has the shape of a sector in cross section.

Figure 7:
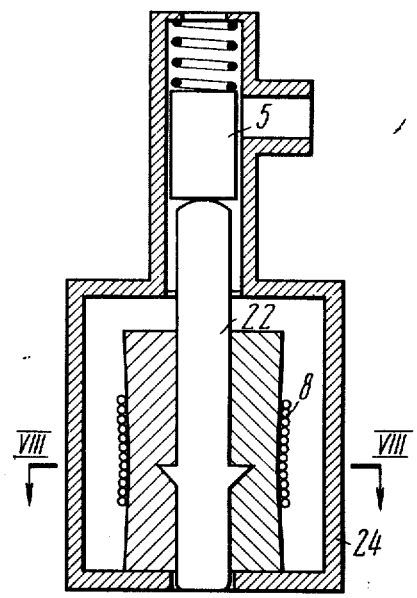
FIG. 7 shows a device for locking the actuating element according to the invention, longitudinal section, third embodiment.
Figure 8:
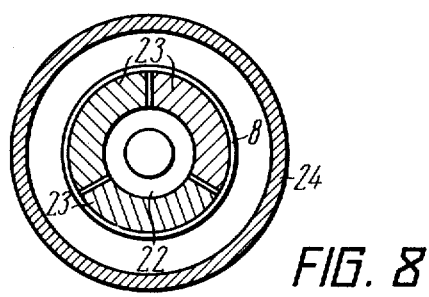
FIG. 8 is a section taken along line VIII—VIII in FIG. 7.

The support can also be divided into a larger number of parts in which case these parts would have to be spread apart a smaller distance for unlocking the actuating element 5. The external surface of the support consisting of parts 23 has the shape of a concave surface of revolution as shown in FIG. 7. This shape of the external surface of the lock portion 7 prevents the spring 8 from creeping towards the ends of the support. All the parts of the device are accommodated in a housing 24.

The device for locking the actuating element functions as follows.

When the actuating element is locked, the flat surfaces of the support 1 (FIGS. 1, 2) and catch 2 are in contact and the projection 6 of the catch 2 is inside the recess 3 of the support 1. The catch 2 is acted upon by the loaded actuating element 5.

The catch 2 and the support 1 are held engaged by the spring 8 located on the cylindrical surface formed by their external surfaces.

For unlocking the actuating element 5, the wire 12 is connected to the source of current 13.

As the wire 12 is heated, the low-melting material $a$ melts and the ends of the bars 10 and 11 spread apart under the force of the spring 8 returning to its free state.

Figure 9:
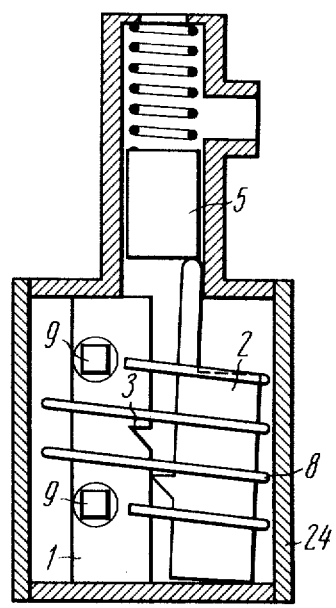
FIG. 9 shows a device illustrated in FIG. 5 in the unlocked position.

Inasmuch as the diameter of the spring 8 in a free state is larger than the diameter of the lock cylindrical portion 7 by the size of the projection 6, the support 1 and the catch 2 become disengaged as shown in FIG. 9.

The projection 6 of the catch 2 comes out of the recess 3 of the support 1 and the load applied to the actuating element 5 forces it on its working stroke.

Other versions of the device function in a similar manner.

The tests conducted on the experimental models of the device have shown that at a load of 2 tons on the actuating element the force keeping the spring against untwisting has been equal to 0.1 kg, the weight of the device being a mere 50 g.

The dotted lines in FIGS. 1, 2, 5, 6 show the parts of the device in the unlocked position, i.e. with the spring in a free state.

We claim:

1. A device for locking an actuating element in a preset position comprising: a support; a catch mating with said support and forming, together with it, a lock, the mating surfaces of said support and catch having a recess on one of them and a projection on the other, said recess and projection being engaged while locking said actuating element, the external surface of said lock having a portion comprising a solid of revolution; a retainer for fixing the relative positions of said support and catch while locking said actuating element, said retainer comprising a torsional spring mounted on said solid of revolution; means for holding said spring from untwisting while locking said actuating element and allowing it to untwist while unlocking said actuating element, said means being located on said lock and connected with at least one end of said spring, said spring having an inside diameter in the free state larger than the outside diameter of said solid of revolution by at least the lateral dimensions of said projection.

2. A device according to claim 1, wherein said solid of revolution comprises a cylinder.

3. A device according to claim 1, wherein said solid of revolution carrying said retainer has a concave external surface.

4. A device according to claim 1, wherein said solid of revolution carrying said retainer is formed by the external surfaces of the catch and said support, said support having a segmental cross section.

5. A device according to claim 1, wherein said solid of revolution carrying said retainer comprises a support having two parts each shaped as a segment of a circle in cross section, and a catch located between said parts.

6. A device according to claim 1, wherein said solid of revolution carrying said retainer comprises a support having three parts each shaped as a sector of a circle in cross section, and a catch in the form of a bar located between said parts.

7. A device according to claim 1, wherein said means for holding said spring while locking said actuating element and releasing said spring while unlocking said element comprises two bars with ends interconnected at one side by a low-melting material adjoining an electric heating element, the other ends of said bars being connected, respectively, with the end of said spring and said support.

8. A device according to claim 1, wherein at least one of the ends of said solid of revolution conprises a solid cylinder carrying several turns of said spring and one of its ends.

* * * * *